United States Patent [19]

Reeves

[11] Patent Number: 4,939,931
[45] Date of Patent: Jul. 10, 1990

[54] RESIDENTIAL WATER METER WITH INTEGRAL FIRE HYDRANT

[76] Inventor: Kenneth Reeves, 102 Valleyview Dr., Old Hickory, Tenn. 37138

[21] Appl. No.: 448,881

[22] Filed: Dec. 12, 1989

Related U.S. Application Data

[63] Continuation-in-part of Ser. No. 309,708, Feb. 2, 1989, abandoned.

[51] Int. Cl.$^5$ ............................................ G01F 15/00
[52] U.S. Cl. ........................................ 73/201; 73/198
[58] Field of Search .................. 73/198, 201; 137/560, 137/861, 800, 272

[56] References Cited

U.S. PATENT DOCUMENTS 1,862,110  6/1932  Conran .................................. 73/198
3,935,736  2/1976  Enright ................................ 73/201

Primary Examiner—John C. Fox
Attorney, Agent, or Firm—Mark J. Patterson

[57] ABSTRACT

A water meter with integrally constructed fire hydrant to be used for residential applications. The device comprises an input, an output, and a hydrant. The output directs water into the home water supply. Water travels throught the input and through a water meter. The path of the water then experiences a divergent path. One path passes through a valve and out of the hydrant. The other path passes into the home water supply. The device can be installed as easily as a water meter presently is installed. In an alternate embodiment, the hydrant is placed prior to the meter in relation to the flow of water.

12 Claims, 2 Drawing Sheets

RESIDENTIAL WATER METER WITH INTEGRAL FIRE HYDRANT

This application is a continuation-in-part of application Ser. No. 309,708 filed Feb. 2, 1989, now abandoned.

BACKGROUND OF THE INVENTION

This invention relates generally to a fire hydrant and water meter manufactured and installed in combination and more particularly to a water meter with integral fire hydrant that can easily be placed in use for residential water supply.

It will be appreciated by those skilled in the art that homeowners in rural and urban areas with distant fire hydrants need a new method of water delivery in the case of fire. Presently, in case of fire, the water department must bill the fire department for the water used. Because the amount of water cannot be measured at the time of the fire with the fire hydrants now in use, the amount of water must be estimated. Therefore, water departments set a high, standard route. This is a very inadequate system.

The installation of fire hydrants in residential areas is very expensive at the present time. Thus, the placement of a more inexpensive fire hydrant is required. Further, the repair and maintenance of fire hydrants is quite expensive because motorists run over them in vehicles and they must be repaired or replaced. Also, this will often result in many hundreds of gallons of water being wasted before the repair can be performed. Further, during the summer months, water departments have problems with unauthorized persons turning the fire hydrants on.

Fire hydrants are particularly acute problems in rural areas. The cost of ordinary fire hydrants are just too great to have one in front of each house. As a result, homeowners in rural areas are forced to pay higher homeowner insurance premiums. A lower premium is available for homeowners with fire hydrants near their homes.

Fire departments also have problems with fire hydrants in several instances. Often, fire hydrants are placed across the road from houses. Thus, the fire department must lay their hoses hundreds of feet, and, at times, across a road. This creates a tremendous traffic problem. Fire departments have also been known to encounter vandalism such as welding the caps on the fire hydrants closed. Still a greater problem is that firemen sometimes find the water pressure inadequate at certain fire hydrants. Thus, the water supplied from the hydrant is insufficient to put out the fire.

Conversely, gauges that measure large flow rates of water are not accurate at a low flow rate, while gauges that measure low flow rates well do not accurately measure the flow rate required during a fire. Therefore, some individuals need a fire hydrant through which unmetered water can flow.

Much development and disclosure has occurred independently for fire hydrants and water meters. For example, U.S. Pat. No. 3,104,554 issued to F. H. Mueller and J. J. Smith on Sept. 24, 1963, discloses a fire hydrant. Further, U.S. Pat. No. 3,439,938 issued to J. T. Dunton on Apr. 22, 1969, also discloses a fire hydrant. However, no developments have been made that combine a water meter and a fire hydrant in residential application to solve problems unique to residential homeowners. Also, no attempts have been disclosed to develop an inexpensive hydrant that can be placed in every residential water line.

Accordingly, it is an object to the present invention to provide a convenient and inexpensive fire hydrant for residential homeowners.

Another advantage of the present invention is to provide an integrated water meter within a fire hydrant so that water departments can more accurately gauge water use.

Still a further object of the invention is to provide a unitarily molded fire hydrant and water meter that can be installed by a water department very easily.

Still a further objective is to provide the capability for rural, residential homeowners to have a fire hydrant in a location proximate to their home.

Still a further objective is to provide the water company with a means of controlling or gauging the flow of water out of the hydrant.

SUMMARY OF THE INVENTION

In the present device, there is a water meter manufactured with an integral fire hydrant. The device has a straight section with an input and an output. Thus, where presently a water department merely sets a water meter in place, the present invention allows the water department to set both a water meter and a fire hydrant into place without any extra work. The first embodiment of the invention measured water flow both through the hydrant and into the house. In between the input and the output respectively, there is a water meter followed by a T-joint. At 18 the stem of the T-joint, there is a section of pipe leading into a valve that is followed by a hydrant. Water comes into the input and passes through the water meter. The water then either continues on into the house or passes through the gate valve. If the water passes through the gate valve, it then passes out of the hydrant output.

The second embodiment measures the flow of water into the house and yet controls the unmetered flow of water out of the hydrant. In between the input and the output there is a water meter preceded by a T-joint. At the stem of the T-joint, there is a section of pipe leading into a valve that is followed by a hydrant. A cap is sealed to the output of the hydrant. Water comes into the input and into the T-joint. During normal circumstances, the water passes through a meter, through the output, and into the home. In emergency situations, the valve can be unlocked and opened after breaking the seal to remove the cap. If the seal is broken, the water company can determine an amount of water that needs to be billed.

DESCRIPTION OF THE PREFERRED EMBODIMENT

Figure 1:
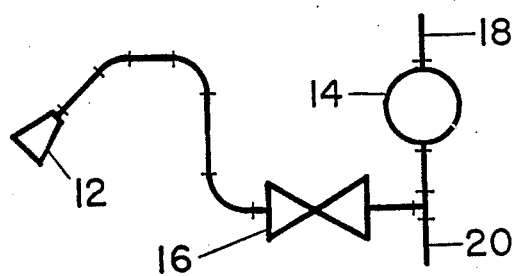
FIG. 1 is a schematic view of the integral fire hydrant and water meter.

Referring now to FIG. 1, there is shown generally at 10 the integral fire hydrant and water meter, preferably molded as a unit out of PVC plastic. As shown, water enters the device 10 2 through an input means 18. Input means 18 Can be threaded or clamped to a water line (not shown). Water then travels through a conduit into a metering means such as a water meter 14. After water passes through water meter 14 such as a standard residential water meter, it passes into a divergent means such as T-joint 22. From T-joint 22, water can either pass through a conduit and out through output means 20 or valve 16. If water passes through valve 16, it passes through first elbow 24, second elbow 26 and third elbow 28. Water exits this branch of device 10 after third elbow 28 through hydrant 12. Elbows 24, 26, and 28 are not required for device lo to work and only represent the preferred embodiment.

Figure 2:
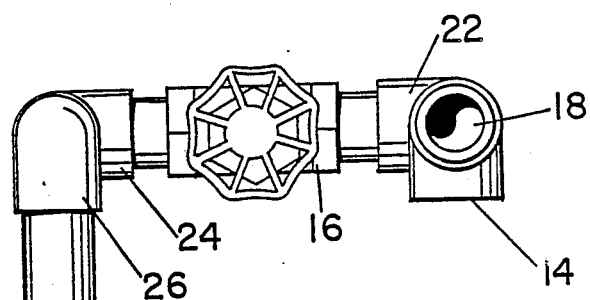
FIG. 2 is a top view of the integral fire hydrant and water meter showing the placement of the water meter, valve, and hydrant in relation to each other.

Referring now to FIG. 2, there can be seen how device 10 is installed into the residential water system. Initially input 18 of device 10 is attached into water line 34. Output 20 is then attached to house line 36.

Figure 3:
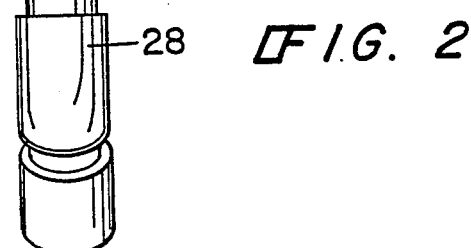
FIG. 3 is a side view of the device illustrating the placement of the hydrant with respect to the input and output.
Figure 3:
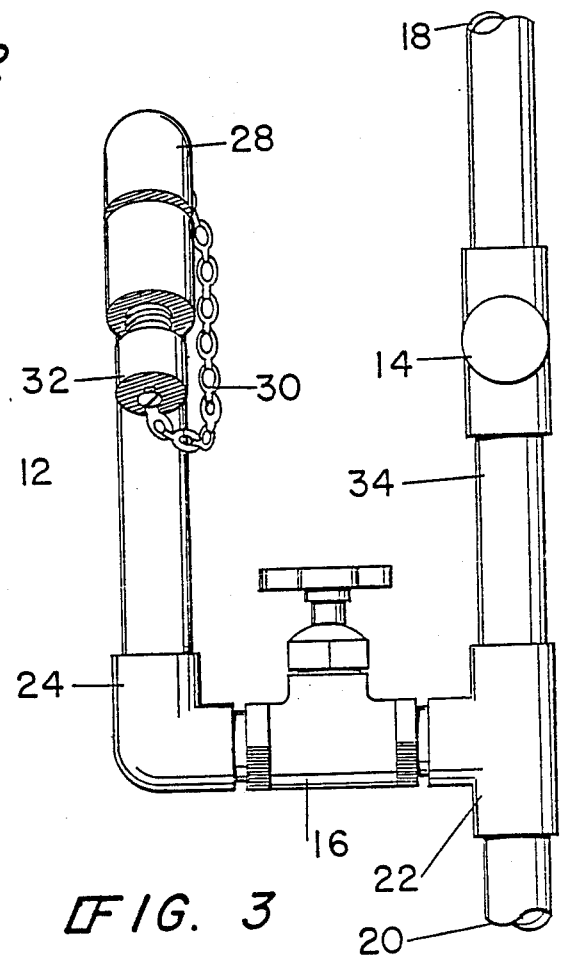

FIG. 3 illustrates the configuration of hydrant output 12. Initially, device 10 is molded such that the section of device 10 20 between first elbow 24 and second elbow 26 is at 90 degrees from an axis along input 18 and house output 20. Third elbow 28 is then molded to form a 45 degree elbow from vertical. Hydrant output 12 has cap 32 which can be placed over hydrant output 12 to prevent dust from getting within device 10.

It Will be appreciated by those familiar in the art, of course, that present water meters installed by local water departments are merely straight line connections between a water line and a house line with a meter in between. Therefore, device 10 is as easily installed as the previous water meters because input 18 and house output 20 are colinear.

Through experimentation and development, device 10 is best formed if hydrant output 12 has a three inch inside diameter PVC material. Because of a typical residential outlet, house output 20 should be normally approximately three-fourths of an inch. Valve 16 should be placed as close to water line 34 as possible so that after the fire hydrant is used, the water can be drained out of the line using drain plug 38. Drain plug 38 prevents water in the line from freezing. Valve 16 should be placed away from hydrant output 12 so that the fire hose would not interfere with turning the water on and off. Cap 32 will prevent dirt and insects from entering device 10 and clogging it so that water can flow more easily. Chain 30 prevents cover from being lost in the rush to extinguish fire.

Braces (not shown) can be added to give the pipe added strength so that it would not bend or break from the firemen pulling the firehose. These braces (not shown) can be rigid wires attached between sections of device 10 proximate to water meter 14 and sections of device 10 proximate to hydrant output 12. Hydrant output 12 should be pointed in the general direction of the house to prevent a kink in the firehose which would restrict or cut off the water flow. Third elbow 28 should be angled upward at a 45 degree angle so that connection of the firehose will be simplified. The 45 degree angle will also cause the water to push the hose upward and away from the edge of the casing (not shown) of the water meter 14 so that it would not be cut or punctured by a sharp edge or burr on the casing (not shown).

Figure 4:
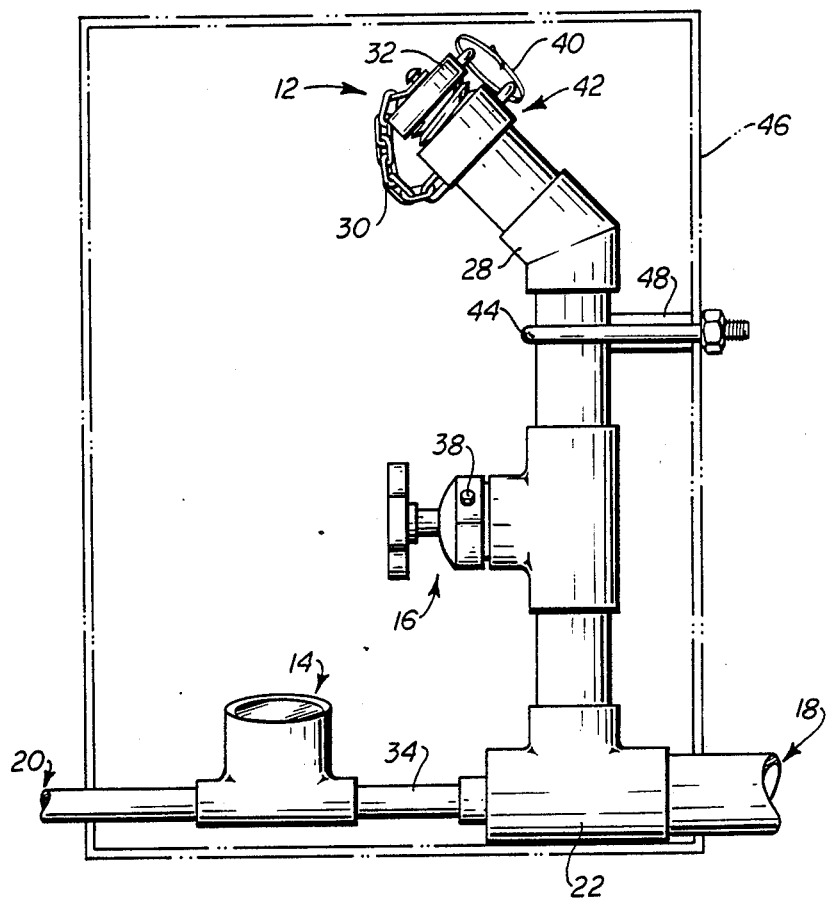
FIG. 4 is a side view of an alternate embodiment of the integral fire hydrant and water meter.

FIG. 4 depicts an alternate embodiment of device 10. In this embodiment, water meter 14 lies after T-joint 22 in relation to the flow of water from input 18 to output 20. Fire hydrant 12 is activated by breaking seal 40 and removing cap 32. Chain 30 prevents cap 32 from being lost in the shuffle of a fire. Valve 16 is opened to introduce water into hydrant 12. Water passes into hydrant, up through elbow 28, and through fire hose connector 42. Before valve 16 is opened, a hose (not shown) is connected to fire hose connector 42 to receive the water. Drain plug 38 can be opened to drain water from hydrant 12 after use. To prevent hydrant 12 from breaking under the pull of a fire house, hydrant 12 is connected to casing 46 by U-bolt 44. Spacer 48 may be placed between U-bolt 44 and casing 46 to increase stability. In the preferred embodiment, spacer 48 is made of plastic.

Thus, although there has been described to this point particular embodiments of the present invention of a unitarily molded fire hydrant and water meter, it is in no way intended that such specific references be considered as limitations upon the scope of this invention except to set forth the following claims.

What I claim is:

1. A residential water meter and integral fire hydrant unit comprising:
   (a) an input means connecting said device to a water line;
   (b) an output means connecting said device to a home water system;
   (c) a dividing means diverging water flow between said output and a hydrant;
   (d) a meter means measuring flow of water between said input means and said dividing means;
   (e) valve means preceding said hydrant to control flow through said hydrant; and
   (f) where said device is pre-assembled as a unit and is adapted for installation in place of a standard residential water meter assembly.

2. The unit of claim 1 wherein the input, output, and dividing means are co-linearly aligned and where said hydrant extends vertically from said dividing means, above the ground, and is angled approximately 45° toward the residential structure.

3. The unit of claim 2 further comprising means for bracing said hydrant to said dividing means proximate to said water meter.

4. The device of claim 2 wherein said hydrant is sized to conform to a standard water hose.

5. The device of claim 4 further comprising a cap to be threadably placed over said hydrant.

6. The device of claim 5 further comprising wire braces stabilizing said device.

7. A residential water meter and integral fire hydrant unit comprising:
   (a) an input means connecting said device to a water line;
   (b) an output means connecting said device to a home water system;
   (c) a dividing means diverting water flow between said output and a hydrant;
   (d) water meter means measuring flow of water between said dividing means and said output means;
   (e) valve means preceding said hydrant to control flow through said hydrant; and (f) where said device is pre-assembled as a unit and is adapted for installation in place of a standard residential water meter assembly.

8. The unit of claim 7 wherein the input, output, and dividing means are co-linearly aligned and where said hydrant extends vertically from said dividing means, above the ground, and is angled approximately 45° toward the residential structure.

9. The unit of claim 8 further comprising means for bracing said hydrant.

10. The device of claim 8 wherein said hydrant is sized to conform to a standard water hose.

11. The device of claim 10 further comprising a cap to be threadably placed over said hydrant.

12. The device of claim 11 further comprising a seal breakably connecting said cap to said hydrant.

* * * * *